Archibald B. Tripler
Machine for Making Ice & for Refrigerating purposes.

N° 112654

PATENTED MAR 14 1871

Witnesses:
J. W. Hamilton Johnson
Charles E. Tripler

Archibald B. Tripler, Inventor,
By his Attorneys,
Hesserman & Johnson.

UNITED STATES PATENT OFFICE.

ARCHIBALD B. TRIPLER, OF NEW ORLEANS, LOUISIANA.

IMPROVEMENT IN APPARATUS FOR MAKING ICE AND FOR REFRIGERATING PURPOSES.

Specification forming part of Letters Patent No. 112,654, dated March 14, 1871; antedated February 28, 1871.

*To all whom it may concern:*

Be it known that I, ARCHIBALD B. TRIPLER, of the city of New Orleans, in the parish of Orleans and State of Louisiana, have invented certain new and useful Improvements in Machines for Making Ice and for Refrigerating Purposes; and I do hereby declare that the following is a full, clear, and exact description thereof, which will enable those skilled in the art to make and use my invention, reference being had to the accompanying drawings of the same, which make part of this specification, and in which—

Figure 1:
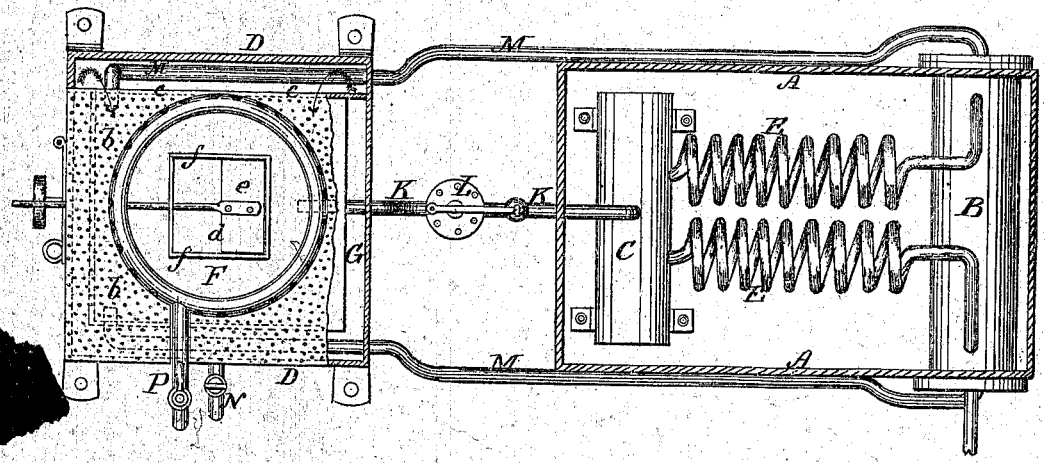
Figure 2:
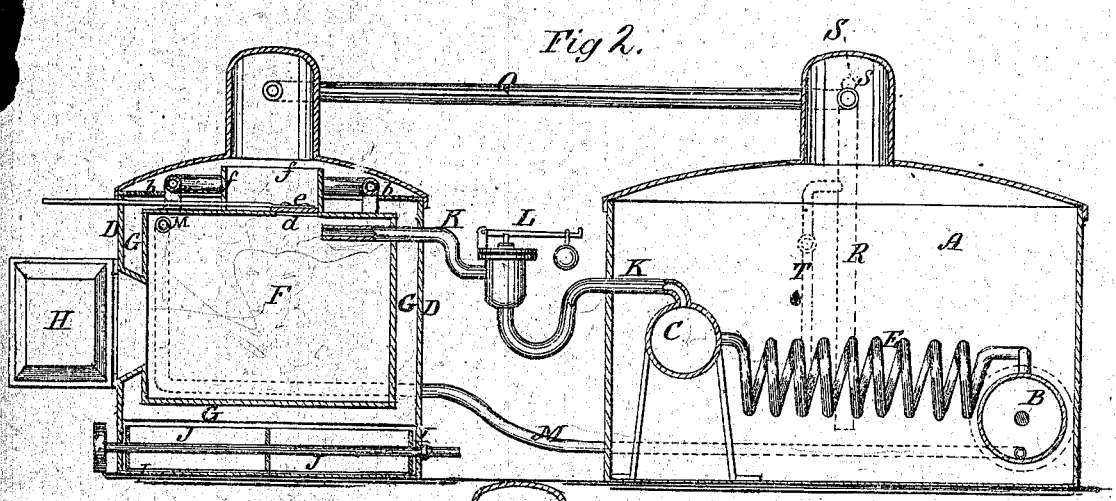
Figure 3:
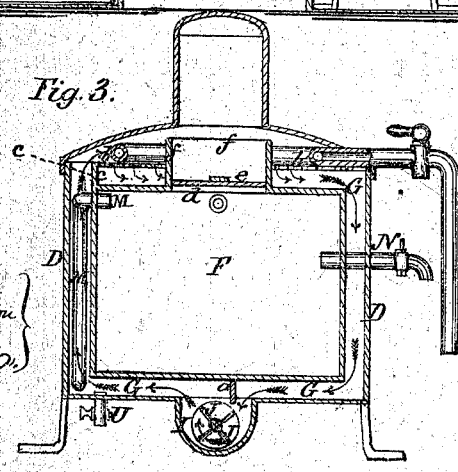

Figure 1 represents a horizontal section of a machine embracing my improvements. Fig. 2 represents a vertical section of the same, and Fig. 3 represents a similar section of the refrigerating-vessel.

My invention relates to an apparatus for making ice and for refrigerating purposes, and in its construction I utilize the well-known principle that air upon compression rises in temperature and falls in corresponding ratio upon expansion, and the heat thus generated by compression I dispose of by evaporation in vacuum.

In the accompanying drawings, A represents the cold-generating vessel, within which a double acting air-pump, B, heat-conducting-pipes, and an expansion-chamber, C, are arranged so as to be subjected alike to the same degree of cold, and D represents the refrigerating-vessel. These vessels are of any suitable construction, and each is provided with an arched top and a dome.

The double-acting air-pump B is arranged so that each end thereof extends outside of the vessel A, and is for the purpose of compressing air to any given degree, and the expansion-chamber C is connected with the air-pump by means of a coil or coils of pipe, E, for the purpose of conducting the air compressed in the pump into the expansion-chamber, and giving out its heat in said transit. At each end of the air-pump there are two valves, one for induction and the other for eduction. These valves are arranged in the ends of the pump, and are opened and closed by the action of the piston.

The refrigerating-vessel D consists of an inner and an outer case, the inner one, F, being the receptacle for the articles to be refrigerated or for the formation of ice, and the outer one, D, for the purpose of forming an intervening chamber or space, G, so as to entirely surround the receiving-chamber. Access is had to this chamber by means of a door, H, the opening for which is inclosed in the intervening space G of the two vessels, and rendered air-tight by suitable packing. This intervening chamber G is filled with any partially non-congealable liquid, such as salt and water, diluted alcohol, or the volatile products of petroleum; and in order that said liquid may have a circulation therein a chamber, I, is formed at the bottom of the outer vessel D, within which is secured a horizontal shaft, having thereon wings J, which, when revolved, impart to said liquid a circulating motion, whereby the evaporation will be more readily effected, the object of which will be hereafter described. The continuity of this chamber is partially interrupted by a partition, $a$, as shown in Fig. 3, attached to the bottom of the inner vessel, and extending into the chamber I parallel with the propeller, thus causing the wings J to draw the liquid in at one side and force it out at the other side of said chamber I with greater force, which has the effect of increasing the speed of the circulation. The winged propeller is driven by a pulley on its outer end or by any suitable means.

In order to still further increase the evaporation of the circulating liquid, a reticulated diaphragm, $b$, is arranged within the circulating-chamber G, above the top of the receiving-chamber F, with which it forms a junction at one side, $c$, so as to cause the liquid to pass up at this side over and upon the said diaphragm $b$, through the holes in which it descends upon the top of the receiving-chamber and down its opposite side, as indicated by the arrows in Fig. 3. This arrangement of the reticulated diaphragm, while it diverts the course of the liquid, also diffuses it while in continuous circulation around the refrigerating-receiver, and thus increases its evaporation. To effect this diffusion of the liquid, it is necessary that the diaphragm should always be above the liquid within the circulating-space.

A vacuum is formed within the arch and dome of the refrigerating-vessel above the receiver by means of an ordinary vacuum-pump, for the purpose of obtaining a more rapid evaporation of the liquid, and thus produce a low degree of temperature. The liquid is introduced into the circulating-chamber G through suitable pipes, P, while said chamber is in a state of vacuum. The effect of this vacuum upon the liquid is kept up by the aid of the vacuum-pump and suitable condensers.

The receiving-vessel F is provided with an opening, d, in its top, which is covered with a slide-valve, e, operated from the outside, the object of which is to open communication between the inner and the dome chamber, as shown in Fig. 2, to produce a vacuum in the inner chamber F, as may be required in effecting the object of refrigeration, as will be hereafter described.

The slide-valve e is surrounded by a collar, f, which prevents the liquid in the circulating-chamber from flowing into the receiving-chamber F when the valve is open.

The receiving-chamber F is connected to the expansion-chamber C by means of a pipe, K, which is intersected by an automatic pressure-valve, L, so that when the pressure in the expansion-chamber reaches a point greater than the resistance offered by the weight of said valve it will open and allow the compressed air to pass into and expand in the receiving-chamber.

The double-acting air-pump B, the expansion chamber, and the coil or coils of pipe E, which connect them in the cold-generating chamber, are covered a suitable depth therein with water or other partially non-congealable liquid. The arch and dome of this generating-vessel are connected with the vacuum-pumps in the same manner as the connection of the vacuum-pumps with the refrigerating-vessel, for the purpose of causing rapid evaporation of the liquid therein, thereby getting rid of the heat of the air within the pump, pipes, and expansion-chamber, generated by its compression, and reducing it to near the freezing-point.

After the air is allowed to expand through the weighted valve into the refrigerating-chamber and perform its refrigerating function it passes through pipes M M, connected with the refrigerating chamber. These pipes pass into and through the circulating-chamber G, back to the air-pump, and connect with the induction-valves thereof, thus causing a continuous circulation of the air at a temperature that will produce ice or for any refrigerating purpose.

In the process of preserving meat by antiseptic compounds, it is cut into suitable pieces and placed in the receiving-chamber in suitable wooden boxes or troughs. The slide-valve e is then opened, which establishes communication between the receiving-chamber F and the vacuum-chamber above, thereby causing the antiseptic preparation to flow, by atmospheric pressure, through the pipe N, from a tank outside, into the troughs containing the meat. The antiseptic being, in this condition, under the influence of vacuum, is thoroughly absorbed by the meat.

The antiseptic may be of any suitable compound used in the curing of meat; but I prefer to use salt, niter, and carbonate of soda, in proper proportions, in a state of solution. The meat is allowed to remain in this condition a sufficient length of time, when the slide-valve e is closed, and the compressed air from the cold-generating vessel is allowed to pass into the refrigerating-receiver, as heretofore described, thus reducing the temperature of the antiseptic compound surrounding the meat, and in this way destroying the animal heat, which is the chief cause of its decomposition.

In the process of making ice, the water to be frozen is placed in suitable compartments or vessels in the receiving-chamber, so as to expose all their sides; the slide-valve e is opened for the purpose of producing a vacuum in said chamber, thereby causing a gradual reduction of the temperature of the water to be frozen and removing the globules of air contained in the water, which, if not extracted, would cause the ice to have a translucent instead of a transparent condition upon congealation. After this is accomplished the air is allowed to flow continuously back and forth from the cold-generating chamber through the automatic valve into the receiver F, until the ice is formed.

It will be observed that the receiver F, being surrounded on all sides by the chamber G, and the compressed air admitted directly into the inner chamber, it will affect alike all sides of the ice-vessels, which result cannot be obtained when the upper sides of said vessels are not so surrounded, as heretofore.

In the application of this invention for the cooling of chambers, hospitals, marine vessels, mines, &c., the refrigerating-vessel is dispensed with, and the compressed air, regulated by the automatic pressure-valve, is forced, by the air-pump, into and through the coil or coils of pipe E, into the expansion-chamber C, from whence it is carried, by suitable pipes, to the chamber or places to be cooled.

The temperature of the air to be thus supplied can be regulated at pleasure by means of the automatic valve.

In order to counteract the outside influence of the atmosphere upon the inclosing-cases of the generating-chamber and refrigerator, I cover these vessels with a suitable non-conductor of heat, in such manner as to entirely insulate the apparatus.

The domes of the cold-generating and refrigerating chambers are connected to each other by a pipe, Q, a branch, R, from which leads to the vacuum-pumps. This pipe is intersected by a stop-cock, S, so that in case a vacuum is not required to be created in the cold-generating chamber, it is closed to cut off its communication, and have the action of the vacuum in the refrigerator only.

In the pipe T leading to the vacuum-pump, I insert a spraying injection-condenser for the purpose of condensing the vapors produced by the vacuum in the generating and refrigerating vessels. The condensing-fluid which I use for this purpose consists of a weak solution of sulphuric acid or chloride of calcium, which, being a more powerful absorbent than water, accomplishes the object more rapidly. The injection of a chemical condensing-fluid I have found to be more speedy and advantageous than the use of dry chemicals or water, but I do not confine myself to this means of condensation.

The circulating-fluid may be withdrawn from the vessels, when desired, by suitable cocks.

I have described the refrigerating-vessel as being constructed with a revolving shaft of wings, to produce a continuous circulation of the fluid surrounding the receiver, but it is obvious that the cold-generating vessel may be provided with a similar-winged propeller for the same purpose.

Having described my invention, I claim—

1. A vacuum created in the cold-generating chamber A, above the surface of the fluid, which covers the heat-conducting coil or coils E, air-pump B, and expansion-chamber C, for the purpose of getting rid of the heat generated by the compressed air, substantially as described.

2. The revolving winged propeller J, located and arranged at the bottom of the refrigerating-case for the purpose of imparting to the fluid surrounding the receiver a continuous circulating motion, substantially as described.

3. The intervening fluid-chamber G of the refrigerator, having its continuity interrupted by means of the partition a, located and arranged near the winged propeller for the purpose of accelerating the circulation of said fluid, as herein shown and described.

4. The circulating-chamber G, closed on one side of the receiver, and open only at its bottom, for the purpose of causing the flow of the liquid over, upon, and through the reticulated diaphragm onto the top of the receiving-chamber F, and down the opposite side of said chamber G, as herein shown and described.

5. In the process of making ice, the gradual reduction of the temperature of the air to the freezing-point, by producing a vacuum within said freezing-chamber, substantially as herein described.

6. A chemical absorbent used for condensing purposes, injected in a state of solution in the pipe or pipes leading to the vacuum-pump, for the purpose of condensing the vapors produced by the vacuum, substantially as described.

7. The slide-valve e, or its equivalent, at the top of the receiver F, for the purpose of opening communication with the receiver and the vacuum-chamber, in order to produce a vacuum in said receiver, substantially as described.

8. The article under preservation, covered with an antiseptic compound, and while in this condition submitted to vacuum for the purpose of more thoroughly diffusing the antiseptic compound in the animal matter under preservation, as herein described.

9. For the purpose of ventilating and cooling a current or currents of air while under compression, passed through a coil or coils of pipe, or other conductors, while submerged in a liquid partially non-congealable, and under the influence of vacuum, as herein described.

10. The compressing air-pump B, the heat conducting-pipes E, and the expansion-chamber C, located and arranged within a single receiver and connected directly to each other so that they will all be subjected to the same degree of cold, in the manner herein described.

11. The combination of a refrigerator, having an inner receiving-chamber, F, surrounding case D, and intervening vacuum and liquid-chamber G, with a cold-generating chamber A, having a compressing air-pump, B, a coil or coils of pipe, E, for transmitting heat, an expansion-chamber, C, and a vacuum-chamber for absorbing and vaporizing said heat, the two vessels, A and F, being connected to each other by an automatic pressure-valve, the several parts being constructed and arranged as herein shown and described.

In testimony whereof I have hereunto set my hand.

A. B. TRIPLER.

Witnesses:
   T. H. UPPERMAN,
   A. E. H. JOHNSON.